Sept. 16, 1952   C. H. WHITE   2,610,453
DISK GANG SPRING BIASING MEANS
Filed Aug. 28, 1948
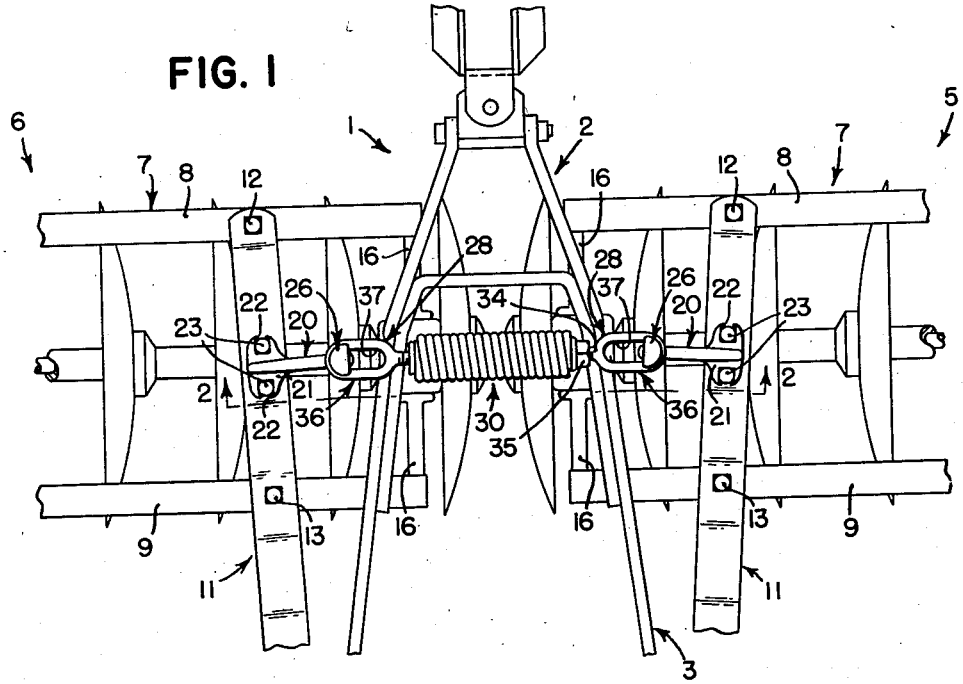
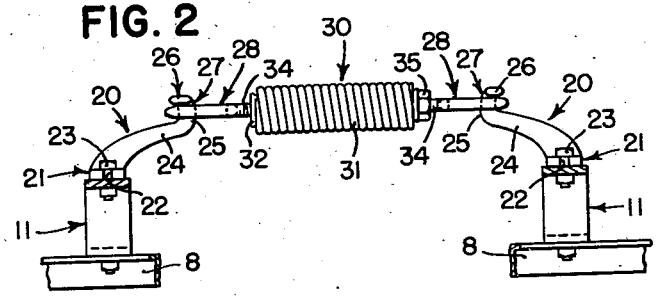
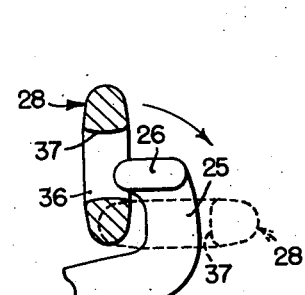
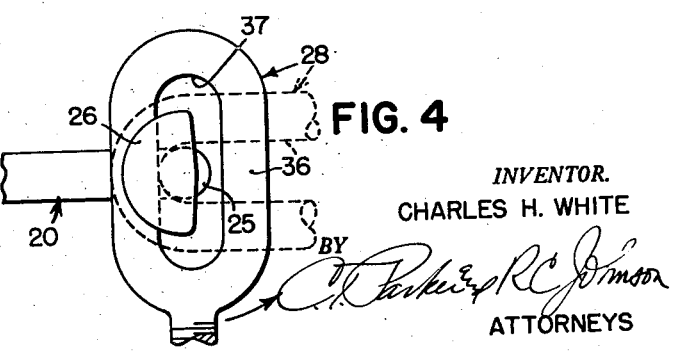
INVENTOR.
CHARLES H. WHITE
BY
ATTORNEYS Patented Sept. 16, 1952

2,610,453

UNITED STATES PATENT OFFICE 2,610,453

DISK GANG SPRING BIASING MEANS

Charles H. White, Moline, Ill., assignor to Deere & Company, Moline, Ill., a corporation of Illinois Application August 28, 1948, Serial No. 46,583

1 Claim. (Cl. 55—81)

The present invention relates generally to agricultural implements and is more particularly concerned with disk harrows of the type shown in my prior Patent No. 2,339,124, issued January 11, 1944.

The object and general nature of the present invention is the provision of a disk harrow having new and improved upthrust resisting means associated with the front ends of the harrow. More particularly, it is an important feature of this invention to provide spring means acting between the gangs of the harrow and having quick detachable means for connecting the ends of the spring unit to the associated disk gangs. It is a further feature of this invention to provide means for connecting the spring unit to the harrow gangs so as to accommodate the fore and aft movement of the gangs into and out of operating position and which is held inherently in connected relation but which may be readily disconnected from the gangs when desired.

More specifically, it is a feature of this invention to provide a new and improved springreceiving bracket especially constructed and arranged to provide for quick connection and disconnection of the spring means which is normally connected to the gang frames through said brackets.

These and other objects and advantages of the present invention will be apparent to those skilled in the art after a consideration of the following description of the preferred embodiment, taken in conjunction with the accompanying drawings, in which:

Figure 1 is a partial plan view of a disk harrow in which the principles of the present invention have been incorporated.

Figure 2 is a fragmentary sectional view taken generally along the line 2—2 of Figure 1.

Figures 3 and 4 are fragmentary detail views showing the manner of connecting each leveling spring link to the associated bracket.

Referring now to the drawings, the disk harrow in which the principles of the present invention have been illustrated comprises a main frame 1 which includes a front draft-receiving section 2 and a rear frame section 3. A pair of front gangs 5 and 6 are pivotally connected to the front portion of the frame 1. Each of the disk gangs 5 and 6 includes a gang frame 7 which is made up of front and rear cross bars 8 and 9 connected together at their outer ends by any suitable means and at their inner ends by an arched cross bar member 11 bolted, as at 12 and 13, to the front and rear frame angles 8 and 9. At its inner end each of the gang frames includes a bearing bracket 16 which is connected to the inner bearing of the associated gang of disks. The front section 2 of the main frame 1 is connected with the above mentioned bearings so that each gang of disks and gang frame may swing both fore and aft and in a generally vertical direction relative to the main frame 1.

When the harrow is in operation the outer ends of the disk gangs are shifted forwardly relative to the inner ends so that the gangs of disks operate at an angle, with the concave side of the disks facing outwardly. The pressure of the soil against the lower portions of the disks tends to cause the inner ends of the gangs to be thrust upwardly, since the line of action of the soil pressure is below the point of contact between the bumpers at the inner ends of the disk gangs. This tendency for the inner ends of the gangs to be thrust upwardly is resisted by a spring connection extending across the frame 1 and arranged to exert a force against the gangs so as to oppose the aforesaid upthrust and cause the gangs to run level.

The inner ends of the frame angles 8 and 9 of each gang frame are connected by the cross brace 11 mentioned above, and according to the principles of the present invention I mount on each of the cross braces 11 a spring-receiving and -supporting bracket indicated in its entirety by the reference numeral 20. Each bracket 20 comprises a base section 21 notched, as at 22, to receive bolts 23 by which the bracket is mounted on the associated support 11. From the base section 21, each bracket is extended upwardly and laterally inwardly, as indicated at 24, and has a rounded neck portion 25 which terminates upwardly in a head portion 26. The head 26 is extended in opposite directions, transversely of the arm portion 24 of the bracket 20, but at one side is curved and shaped, as indicated at 27, so as to readily receive a slotted link 28 which forms a part of a central acting tension or spring unit 30.

The spring or tension unit 30 comprises a spring 31 of the closely-coiled pre-stressed type. Into each end of the spring 31 a screw-threaded plug 32 is disposed, each plug 32 having an outer surface shaped to conform to the convolutions of the spring, and the opening in each plug being screw threaded to receive the threaded end 34 of the associated slotted link 28. A lock nut 35 on one of the links cooperates with the associated plug to prevent any shifting of the spring 31 on the links 28. The slotted portion of each link 28 is indicated by the reference numeral 36 and includes an elongated slot 37 the width of which is such that when the link 28 is turned crosswise relative to the associated bracket 20 the slot 37 permits the end 36 to be passed over the head portion 26 and over onto the bracket neck portion 25, as shown in Figure 3. The link 28 may then be turned relative to the bracket 20 so as to extend transversely of the harrow, as shown in Figure 4, and thus be in a position, together with the companion link 28 at the other side of the harrow, to receive the spring 31 by threading the plugs 32 onto the links 28. To this end, the threaded portion 34 of one link is right hand while the corresponding threaded portion of the other link is left hand, and the spring plugs 32 are similarly threaded interiorly. After the spring 31 has been turned to produce the desired tension between the brackets 20 the lock nut 35 may be tightened to retain the desired adjustment. The tension exerted by the spring 31 serves to hold the outer or slotted portions 36 of the connecting links 28 against the neck portions 25 of the associated brackets 20, and since the head portion 26 extends transversely, the latter overlies the slotted portions of the links and prevents them from becoming disengaged therefrom so long as the links remain in their working or active position transversely of the main frame. However, the parts may be readily disengaged merely by unscrewing the spring unit 30 so as to permit the disconnection of at least one of the links, whereupon that link and the spring and other link may be turned into a transverse position relative to the associated bracket 28 so as to be readily disengaged therefrom.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

In a disk harrow of the type including two oppositely extending mutually reacting disk gangs: the improvement which comprises spring means for resisting the upthrust at the inner ends of the gangs, including a bracket fixed to each gang, a spring, a pair of links screw threadedly connected with the ends of said spring, one threaded connection being right hand and the other being left hand, whereby turning said spring relative to said links serves to adjust the positions of the latter relative to the spring, the outer ends of said links being slotted, each of said brackets including a section extending generally upwardly and having a rounded neck portion extending generally vertically upwardly from the upper end of said section, and the upper part of said vertical neck portion carrying a generally semicircular head portion fixed adjacent its widest part to said neck portion and disposed in a generally horizontal plane and extending laterally outwardly of the harrow alongside but spaced generally vertically above the upper part of the associated generally upwardly extending section, said vertical spacing being greater than the thickness of the slotted portion of the associated link, the width of the slot in each link being greater than the diameter of the associated rounded vertical neck portion and the width and length of the slot being sufficient to provide for turning each link into a position with the slotted portion disposed in a generally vertical fore-and-aft extending plane, passing the slotted portion over the semicircular head portion of the bracket and swinging the slotted link portion downwardly into a horizontal plane so as to lie generally in the space between said head portion and the upper part of the associated inwardly and upwardly extending section and so as to embrace the associated neck portion, and then turning each link into a position aligned with the other link, the length of the slot in each of said screw-threaded links being of sufficient length to accommodate swinging said links into alignment with each other and with the spring means, disposed between said links, whereby the spring may be threaded onto the adjacent ends of said links and turned relative thereto to establish the desired connection and tension between said brackets.

CHARLES H. WHITE.

REFERENCES CITED

The following references are of record in the file of this patent:

UNITED STATES PATENTS

| Number | Name | Date |
| --- | --- | --- |
| 500,836 | Albach | July 4, 1893 |
| 1,140,940 | Bales | May 25, 1915 |
| 1,802,406 | Dale | Apr. 28, 1931 |
| 2,062,756 | McKahin | Dec. 1, 1936 |
| 2,226,587 | Seaholm | Dec. 31, 1940 |
| 2,339,124 | White | June 11, 1944 |